Patented Sept. 2, 1941

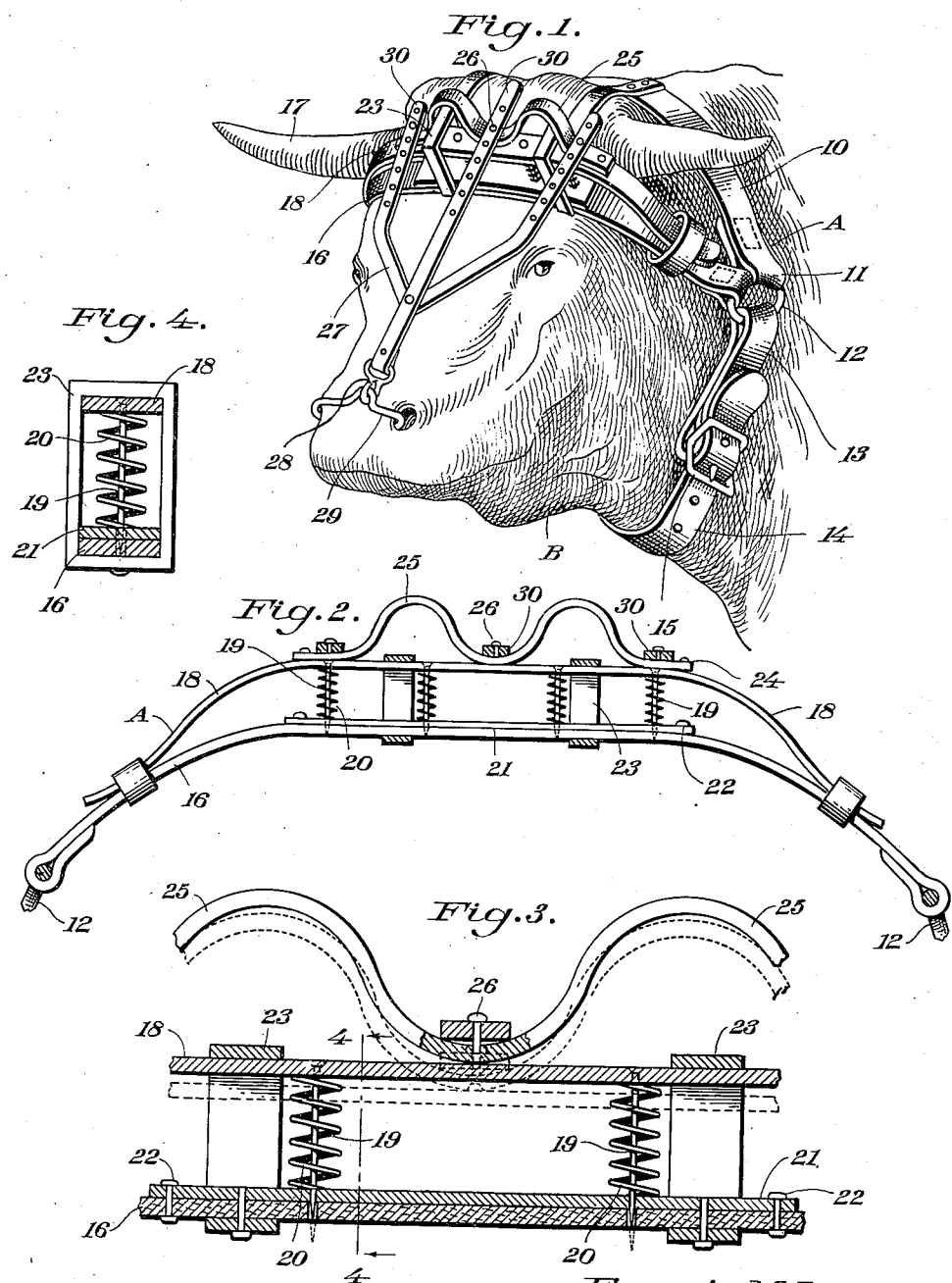

2,254,574

UNITED STATES PATENT OFFICE 2,254,574

ANIMAL RESTRAINER

Francis M. Jackson, Russiaville, Ind.

Application February 26, 1940, Serial No. 320,906

4 Claims. (Cl. 119—142)

The invention relates to a taming device for use on animals and more especially to animal restraining devices.

The primary object of the invention is the provision of a device of this character wherein the same when applied to an animal will prevent the latter from butting or ramming and in this way taming the animal or restraining the latter from injury to human life or injury to other animals and also avoids the possibility of the animal getting through fences or other barriers.

Another object of the invention is the provision of a device of this character wherein the same is worn on the head of an animal and can be readily and conveniently applied and removed, being susceptible of adjustment to fit different sizes of animals.

A further object of the invention is the provision of a device of this character, wherein the same when worn by an animal will inflict pain on the animal should an attempt be made to inflict injury upon another animal or human being or should an attempt be made to go through a fence or other enclosure and in this manner taming the animal to relieve ferociousness and harmful activity of the same.

A still further object of the invention is the provision of a device of this character, which is simple in its construction, thoroughly reliable and efficacious in operation, being a halter or bridle for the head of an animal, susceptible of convenient application, being possessed of strength and durability, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a perspective pictorial view of the head of an animal showing the device constructed in accordance with the invention applied.

Figure 2 is a fragmentary transverse sectional view of the device.

Figure 3 is an enlarged fragmentary sectional view showing by full lines one position and by dotted lines another position in the working thereof.

Figure 4 is a sectional view taken on the line 4—4 of Figure 3 looking in the direction of the arrows.

Similar reference characters indicate corresponding parts throughout the several views in the drawing.

Referring to the drawing in detail, A designates generally the device constituting the present invention and B a pictorial representation of the head of an animal to which such device is to be applied, the said device being hereinafter fully described.

The device A comprises a head saddling strap 10 having attached at each end thereof in loop formations 11 rings 12 for the carrying of the companion parts 13 and 14, respectively, of an adjustable securing strap, the part 13 being provided with a buckle 15 for adjustability of the part 14 which engages therewith. The rings 12 have connected therewith a crown or brow strap 16 which is carried over the brow of the head B while the strap 10 saddles the head rearwardly of the horns 17 of the animal while the adjustable securing strap is carried under the neck of the animal and in this manner the head of the animal is haltered or bridled.

Outwardly of the crown or brow strap 16 is an outwardly bowed inherently resilient and compressible bridge piece 18 which at intervals has fixed thereto piercing tines or prongs 19 which are adapted to pass through suitable clearances in the crown or brow strap 16 to inflict pain on the animal when the piece 18 is depressed. These tines or prongs 19 are pointed at their free ends and have surrounding the same coiled compression springs 20 which are interposed between the said piece 18 and a reinforcing base piece 21, which is riveted or otherwise made fast at 22 to the crown or brow strap 16, being provided with clearances for the passage of the pointed ends of the prongs or tines 19 to inflict pain on the animal in the wearing of the device should such animal butt or ram its head against a barrier, fence or the like or against a human being.

Rigidly secured to the inner face of the strap 16 are two guide loops or yokes 23, which extend outwardly loosely around the bridge piece 18 and allow the free inward movement of the bridge piece therein.

Riveted or otherwise fastened at 24 to the piece 18 is a corrugated or fluted frontal piece 25 carrying headed studs 26 in the depressing or receding areas thereof for adjustable connection therewith of a triple-armed, fork-like hanger piece 27 which through a snap hook 28 has connection with a nose clip or ring 29 for engagement in the nostril cavities of the animal and in this manner adjustment of the device is assured and the crown or brow strap 16 is prevented from working backwardly of the head of the animal, being retained properly in its required position at the brow of the head of the animal.

The arms of the hanger piece 27 are provided with suitable holes 30 for the studs 26 so that the hanger can be selectively adjusted according to the locality of the holes 30.

An animal when wearing the device will be hurt through the piercing action of the tines or prongs 19 when butting or ramming and in this manner the device restrains the animal from inflicting injury to human beings or from breaking through an enclosure, that is to say, through a fence, barrier or the like, and tends to tame the animal.

What is claimed is:

1. A device of the character described, comprising an adjustable halter for the head of an animal and having a brow strap, a depressible strip on said strap, prongs carried by said strip and adapted to pass through the brow strap, means for holding the depressible strip outwardly, a hanger adjustably connected to the strip, and a nostril engaging element carried by the lower end of the hanger.

2. A device of the character described, comprising an adjustable halter for the head of an animal and having a brow strap, a depressible strip on said brow strap, prongs carried by said strip and passing through openings in the brow strap, coil springs surrounding the prongs and normally holding the depressible strip outwardly, a hanger adjustably connected to the depressible strip, and a nostril engaging element carried by the lower end of the hanger.

3. A device of the character described, comprising an adjustable halter for the head of an animal and having a brow strap, rigid means for connecting the brow strap to the neck portion of the halter, a depressible strip carried by the brow strap, prongs carried by said strip and adapted to pass through openings in the brow strap, coil springs surrounding the prongs between the depressible strip and the brow strap and normally holding the depressible strip outwardly, a hanger adjustably connected to the depressible strip, and a nostril engaging element detachably carried by the lower end of the hanger.

4. A device of the character described, comprising an adjustable halter for the head of an animal and having a brow strap, a depressible strip on said brow strap, rigid means for connecting the brow strap to the neck portion of the halter, prongs carried by the inner face of the strip and adapted to pass through openings in the brow strap, springs between the depressible strip and the brow strap for normally holding the same outwardly, a hanger yoke having its arms adjustably connected to the depressible strip, and a nostril engaging element carried by the lower end of the hanger yoke.

FRANCIS M. JACKSON.